United States Patent
Degenkolb

(10) Patent No.: US 10,137,947 B2
(45) Date of Patent: Nov. 27, 2018

(54) VEHICLE SPARE TIRE AND TOWING SYSTEM

(71) Applicant: FORD GLOBAL TECHNOLOGIES, LLC, Dearborn, MI (US)

(72) Inventor: Jay Robert Degenkolb, Rockwood, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 15/366,502

(22) Filed: Dec. 1, 2016

(65) Prior Publication Data
US 2018/0154953 A1 Jun. 7, 2018

(51) Int. Cl.
| | | |
|---|---|---|
| *B62D 43/10* | (2006.01) | |
| *B60D 1/52* | (2006.01) | |
| *B60D 1/56* | (2006.01) | |
| *B62D 25/08* | (2006.01) | |
| *B62D 25/20* | (2006.01) | |
| *B60D 1/58* | (2006.01) | |

(52) U.S. Cl.
CPC ............ *B62D 43/10* (2013.01); *B60D 1/52* (2013.01); *B60D 1/565* (2013.01); *B60D 1/58* (2013.01); *B62D 25/087* (2013.01); *B62D 25/2027* (2013.01)

(58) Field of Classification Search
CPC ........ B62D 43/10; B62D 43/06; B62D 43/08; B62D 25/087; B62D 25/2027; B60D 1/565; B60D 1/56; B60D 1/52

USPC ............ 296/37.2, 187.08; 293/117; 224/534, 224/42.12, 42.13, 42.18, 42.24, 42.26, 224/42.25, 42.14, 42.19, 42.27, 42.29, 224/42.3
See application file for complete search history.

(56) References Cited

U.S. PATENT DOCUMENTS

| | | | | |
|---|---|---|---|---|
| 4,687,124 A | * | 8/1987 | Mahr ..................... | B62D 43/10 224/42.24 |
| 5,785,218 A | * | 7/1998 | LaLone .................. | B62D 43/02 224/42.13 |
| 9,315,160 B2 | * | 4/2016 | Xu ......................... | B60R 11/06 |

FOREIGN PATENT DOCUMENTS

| | | |
|---|---|---|
| GB | 302464 | 12/1928 |
| KR | 20040031238 | 10/2002 |
| WO | 9515880 | 12/1994 |

* cited by examiner

*Primary Examiner* — Stephen T Gordon
(74) *Attorney, Agent, or Firm* — Jason Rogers; Brooks Kushman P.C.

(57) ABSTRACT

A vehicle includes a frame, load floor, subfloor, spare tire, jack, and a tow-eye. The frame defines a trunk. The load floor and the subfloor are each secured to the frame and disposed within the trunk. The load floor and the subfloor define a spare tire receptacle therebetween. The spare tire and the jack each define orifices and are disposed within the receptacle. The tow-eye has a fastening portion extending therefrom. The fastening portion extends through the orifices and engages the subfloor to secure the spare tire and jack to the subfloor.

14 Claims, 4 Drawing Sheets

VEHICLE SPARE TIRE AND TOWING SYSTEM

TECHNICAL FIELD

The present disclosure relates to vehicle systems including spare tires systems and towing systems.

BACKGROUND

Vehicles may include spare tires that are that are stored within a compartment of the vehicle. Vehicles may also include connection points where the vehicle may be secured to a second vehicle during a towing operation.

SUMMARY

A vehicle includes a frame, load floor, subfloor, spare tire, jack, and a tow-eye. The frame defines a trunk. The load floor and the subfloor are each secured to the frame and are disposed within the trunk. The load floor and the subfloor define a spare tire receptacle therebetween. The spare tire and the jack each define orifices and are disposed within the receptacle. The tow-eye has a fastening portion extending therefrom. The fastening portion extends through the orifices and engages the subfloor to secure the spare tire and jack to the subfloor.

A vehicle includes a floor panel, spare tire, and tow-eye. The floor panel defines a spare tire receptacle and a first tapped hole. The spare tire defines a through hole and is disposed within the receptacle. The tow-eye has a threaded rod extending therefrom. The threaded rod extends through the through hole and is threaded into the first tapped hole to secure the spare tire to the floor panel.

A vehicle spare tire system includes a panel, spare tire, jack, and tow-eye. A receptacle is defined by the panel. The spare tire and the jack each define orifices and are disposed within the receptacle. The tow-eye has a fastening portion extending therefrom. The fastening portion extends through the orifices and engages the panel to secure the spare tire and jack to the subfloor.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
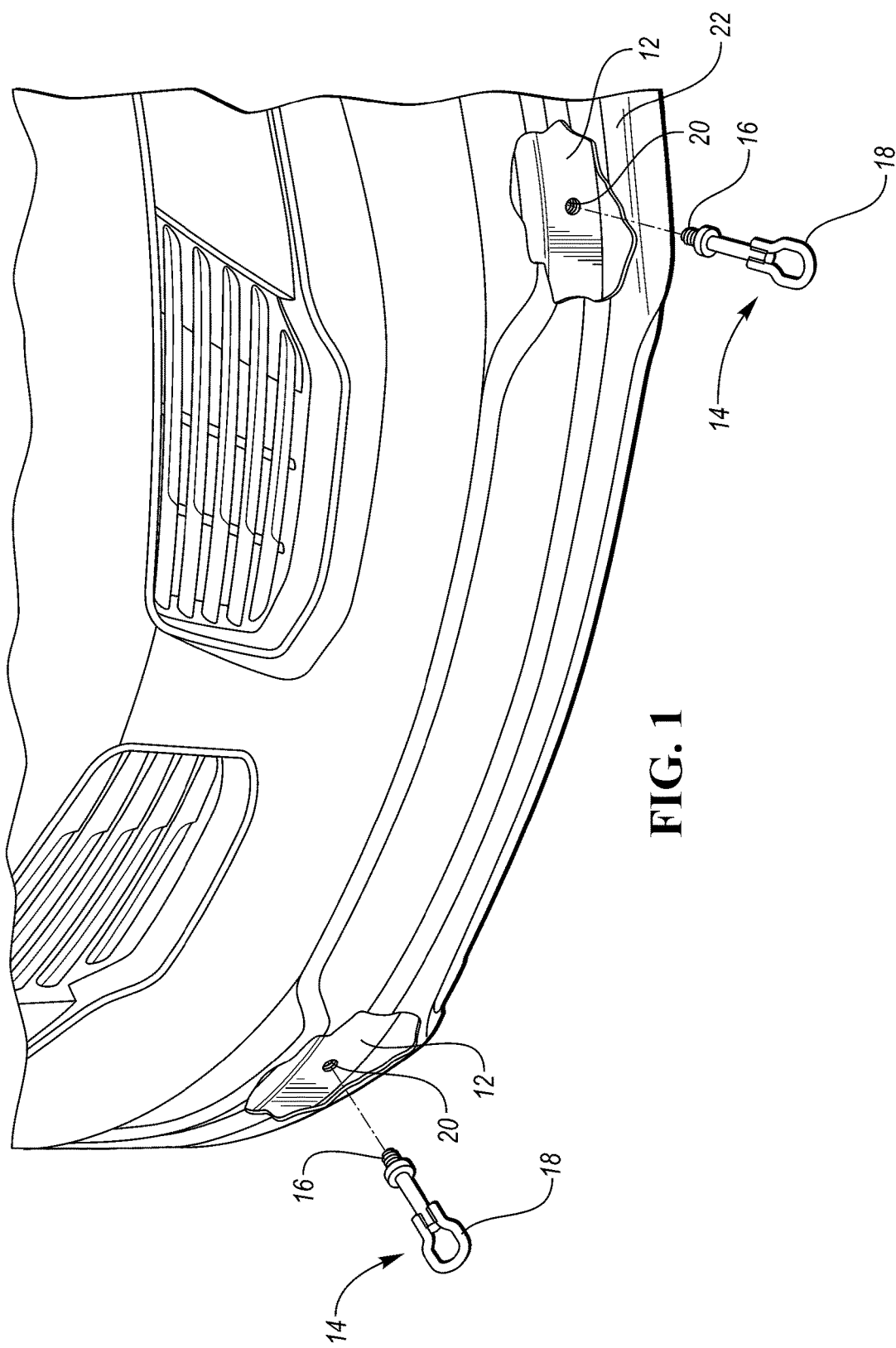
FIG. 1 is an illustration of a perspective front view of a representative vehicle having both a spare tire and a towing system.

Referring to FIG. 1, a perspective front view of a representative vehicle 10 having both a spare tire and a towing system is illustrated. The vehicle 10 includes a body and/or frame 12. The body and/or frame 12 provide the structural strength and integrity of the vehicle 10. The various subsystems of the vehicle 10, including but not limited the powertrain components, steering components, suspension components, fuel delivery system components, braking system components, exhaust system components, cabin interior components (e.g., the passenger seats), etc., are secured to and supported by the body and/or the Frame 12. During a towing operation, one or more tow-eyes 14 may be secured to the body and/or frame 12. The tow-eyes 14 may include a fastening portion 16 and an eyelet 18. The fastening portion 16 maybe a threaded rod.

The body and/or frame 12 may define a first set of one or more tapped orifices 20 located on or proximate to a front bumper 22. The fastening portions 16 of the tow-eyes 14 may be threaded or received into the tapped orifices 20 while a towing hookup from another vehicle is secured to the eyelets 18 of tow-eyes 14 during a towing operation where the vehicle 10 is being towed from a front position of the vehicle 10.

Figure 2:
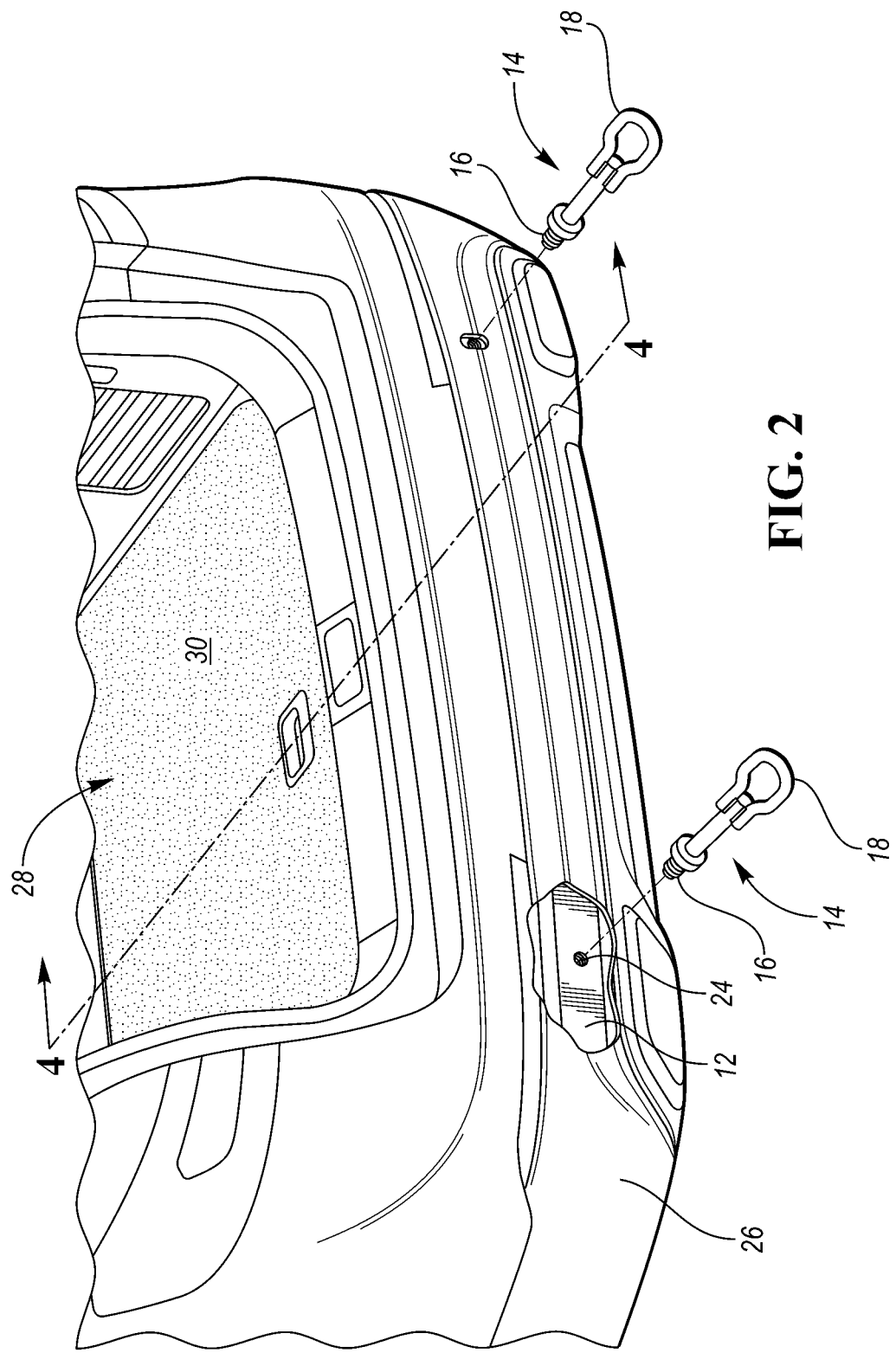
FIG. 2 is an illustration of a perspective rear view of the representative vehicle having both spare tire and towing systems.

Referring to FIG. 2, a perspective rear view of the representative vehicle 10 having both a spare tire and a towing system is illustrated. The body and/or frame 12 may define a second set of one or more tapped orifices 24 located on or proximate to a rear bumper 26. The fastening portions 16 of the tow-eyes 14 may be threaded or received into the tapped orifices 24 while a towing hookup from another vehicle is secured to the eyelets 18 of tow-eyes 14 during a towing operation where the vehicle 10 is being towed from a rear position of the vehicle 10.

The body and/or frame 12 may define a storage space or trunk 28. For illustrative purposes, a rear door or hatch has been removed to expose the storage space or trunk 28. A first floor 30 may be secured to the body and/or frame 12 and disposed within the trunk 28. The first floor 30 may be a load floor that is configured to support cargo that is being transferred by the vehicle 10. The first floor 30 may be movable exposing a second floor 32 (or subfloor) and a spare tire system 34 that is stored between the first floor 30 and the second floor 32. The first floor 30 (load floor) and the second floor (or subfloor) 32 may be specific body or interior trim panels that are part of a vehicle storage or trunk system.

Figure 3:
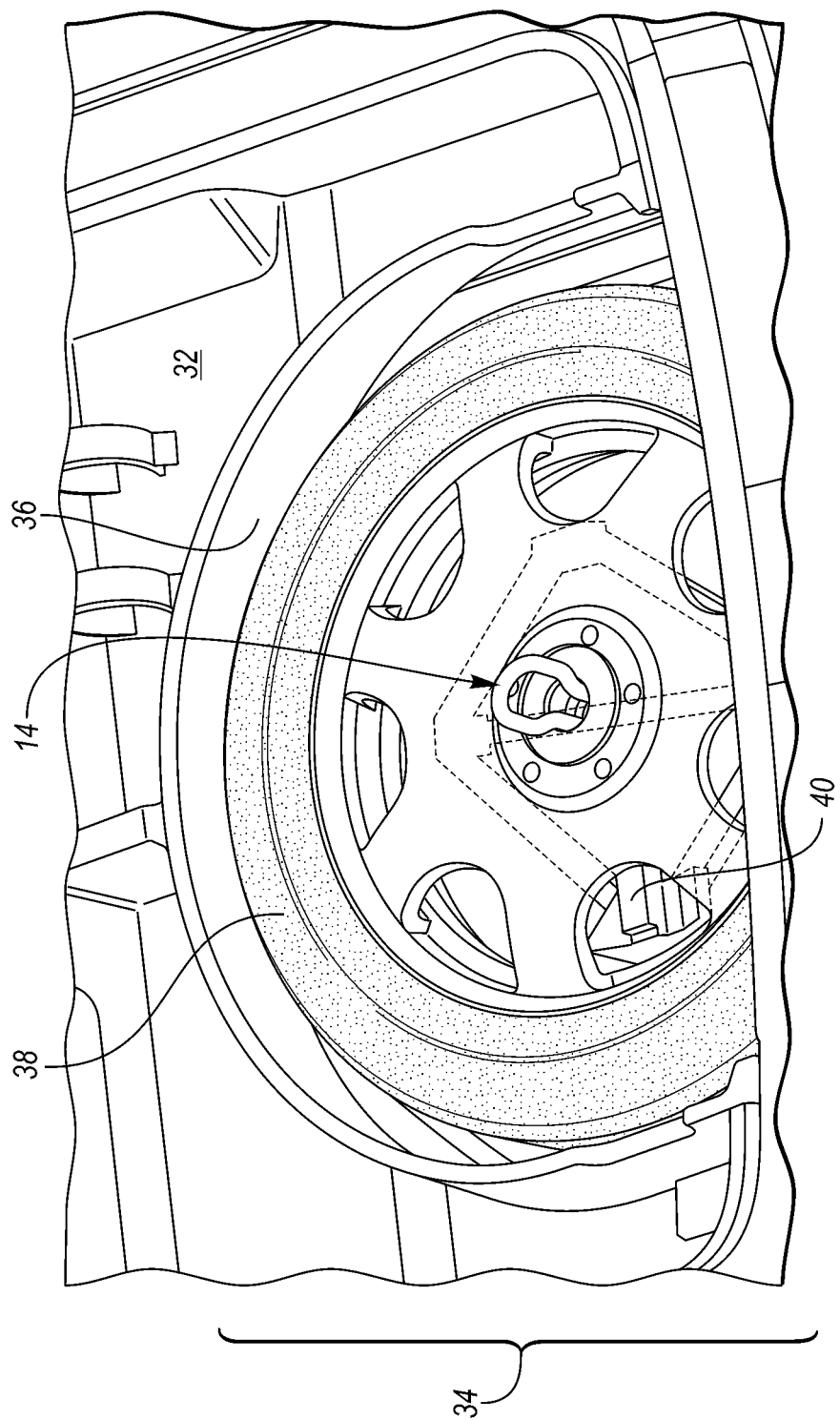
FIG. 3 is an illustration of a perspective view of the spare tire system and a spare tire receptacle located within the vehicle.

Referring to FIG. 3, perspective view of the spare tire system 34 and a spare tire receptacle 36 located within the vehicle 10 is illustrated. The first floor (or load floor) 30 has been removed in FIG. 3 so that the spare tire system 34, spare tire receptacle 36, and second floor (or subfloor) 32 are exposed. The spare tire system 34 includes a spare tire 38 and a jack 40. The spare tire 38 may refer to both the rubber tire portion and metallic rim portion of a spare tire or wheel. One of the tow-eyes 14 may be utilized as part of the spare tire system 34 to secure the spare tire 38 and the jack 40 to the subfloor 32 within the spare tire receptacle 36.

Figure 4:
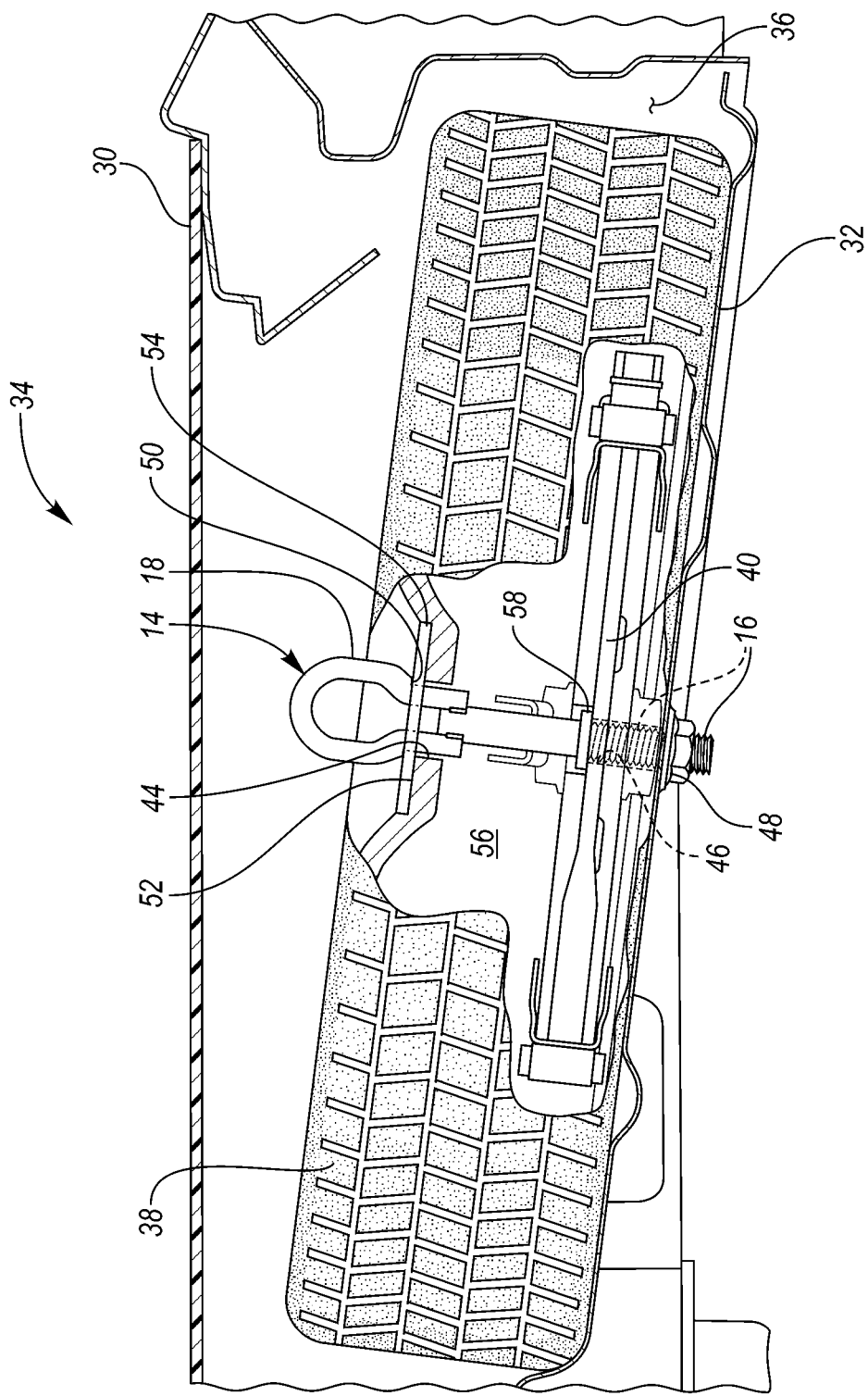
FIG. 4 is a cross-sectional view of the spare tire system taken along line 4-4 in FIG. 2.

Referring to FIG. 4, a cross-sectional view of the spare tire system 34 taken along line 4-4 in FIG. 2 is illustrated. The spare tire receptacle 36 is defined between the first floor (or load floor) 30 and the second floor (or subfloor) 32. The spare tire receptacle 36 is also defined within or immediately below the storage space or trunk 28. It should be understood however that the spare tire receptacle 36 may be located at any position on or within the vehicle 10 and that the spare tire system 34 may be disposed between any two vehicle body or trim panels other than the first floor (or load floor) 30 and second floor (or subfloor) 32. The spare tire 38 may define a first orifice 44. More specifically, the metallic rim portion of the spare tire 38 may define the first orifice 44. The jack 40 may define a second orifice 46. The first orifice 44 defined by the spare tire 38 and the second orifice 46 defined by the jack 40 may each be through holes that extend entirely through the spare tire 38 and the jack 40, respectively.

When the spare tire 38 and the jack 40 are not in use, they are each disposed within the spare tire receptacle 36 such that the first orifice 44 defined by the spare tire 38 becomes aligned with the second orifice 46 defined by the jack 40. The fastening portion 16 of the tow-eye 14 may extend through the first orifice 44 defined by the spare tire 38 and the second orifice 46 defined by the jack 40 in order to secure the spare tire 38 and the jack 40 to the second floor (or subfloor) 32 and within the spare tire receptacle 36.

The fastening portion 16 of the tow-eye 14 may engage the second floor (or subfloor) 32 in order to secure the spare tire 38 and the jack 40 to the second floor (or subfloor) 32 and within the spare tire receptacle 36. More specifically, the fastening portion 16 of the tow-eye 14 may engage in nut 48 in order to secure the spare tire 38 and the jack 40 to the second floor (or subfloor) 32 and within the spare tire receptacle 36. The nut 48 may be welded to the second floor (or subfloor) 32 on an opposing side of the second floor (or subfloor) 32 relative to the spare tire system 34. The nut 48 may define a tapped orifice and the fastening portion 16 (which may be a threaded rod) may engage (i.e., threaded into) the tapped orifice of the nut 48 in order to secure the spare tire 38 and the jack 40 to the second floor (or subfloor) 32 and within the spare tire receptacle 36. The tapped orifice of the nut 48 may include the same thread dimensions as the first set of one or more tapped orifices 20 located on or proximate to the front bumper 22. The tapped orifice of the nut 48 may also include the same thread dimensions as the second set of one or more tapped orifices 24 located on or proximate to the rear bumper 26.

The tow-eye 14 may include a ridge portion 50 that is located between the eyelet 18 of the tow-eye 14 and the fastening portion 16 of the tow-eye 14. The ridge portion 50 may be a surface that is a portion of the eyelet 18 that faces toward the fastening portion 16 of the tow-eye 14. The spare tire 38 may include an upper or outer surface 52. More specifically, the metallic rim portion of the spare tire 38 may include the upper or outer surface 52. The spare tire system 34 may also include a washer 54 that is disposed between the spare tire 38 and the tow-eye 14. More specifically, the washer 54 may be disposed between the eyelet 18 and the upper or outer surface 52 of the metallic rim portion of the spare tire 38. The washer 54 may engage the ridge portion 50 of the tow-eye 14 and the upper or outer surface 52 of the spare tire 38 in order to secure the spare tire 38 to the second floor (or subfloor) 32 and within the spare tire receptacle 36. The jack 40 may be disposed within a cavity 56 defined by the spare tire 38 on an opposing side of the spare tire 38 relative to the upper or outer surface 52. More specifically, the cavity 56 may be defined by the metallic rim portion of the spare tire 38 on the opposing side of the spare tire 38 relative to the upper outer surface 52.

The tow-eye 14 may include a second ridge portion 58 that is disposed about the fastening portion 16 of the tow-eye 14. The second ridge portion 58 may engage an upper or outer surface of the jack 40 to secure the jack 40 to the second floor (or subfloor) 32 and within the spare tire receptacle 36.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
   a frame defining a trunk;
   a load floor and a subfloor each secured to the frame, disposed within the trunk, and defining a spare tire receptacle therebetween;
   a spare tire and a jack each defining orifices and disposed within the receptacle; and
   a tow-eye having a fastening portion extending therefrom, wherein the fastening portion extends through the orifices and engages the subfloor to secure the spare tire and jack to the subfloor, and wherein the tow-eye includes a ridge between an eyelet of the tow-eye and the fastening portion, the spare tire includes an outer surface, and a washer disposed between the spare tire and the tow-eye engages the ridge and the outer surface to secure the spare tire and jack to the subfloor when the fasting portion engages the subfloor.

2. The vehicle of claim 1, wherein the fastening portion is a threaded rod.

3. The vehicle of claim 2 further comprising a nut that defines a first tapped orifice, wherein the nut is welded to the subfloor and the threaded rod engages the first tapped orifice such that tow-eye secures the spare tire and jack to the subfloor.

4. The vehicle of claim 3, wherein the frame defines a second tapped orifice having the same thread dimensions as the first tapped orifice, and the second tapped orifice is configured to receive the threaded rod of the tow-eye for a towing operation.

5. The vehicle of claim 4, wherein the second tapped orifice is defined in a front of the frame proximate a front bumper.

6. The vehicle of claim 4, wherein the second tapped orifice is defined in a rear of the frame proximate a rear bumper.

7. A vehicle comprising:
   a frame defining a trunk and a first tapped orifice;

a load floor and a subfloor each secured to the frame, disposed within the trunk, and defining a spare tire receptacle therebetween;

a nut defining a second tapped orifice and welded to the subfloor;

a spare tire and a jack each defining orifices and disposed within the receptacle; and a tow-eye having a threaded rod extending therefrom, wherein the threaded rod extends through the orifices and engages the second tapped orifice to secure the spare tire and jack to the subfloor, and wherein the first tapped orifice has the same thread dimensions as the second tapped orifice such that the first tapped orifice is configured to receive the threaded rod of the tow-eye for a towing operation.

8. The vehicle of claim 7, wherein the first tapped orifice is defined in a front of the frame proximate a front bumper.

9. The vehicle of claim 7, wherein the first tapped orifice is defined in a rear of the frame proximate a rear bumper.

10. The vehicle of claim 7, wherein the tow-eye includes a ridge between an eyelet of the tow-eye and the threaded rod, the spare tire includes an outer surface, and a washer disposed between the spare tire and the tow-eye engages the ridge and the outer surface to secure the spare tire and jack to the subfloor when the threaded rod engages the subfloor.

11. A vehicle comprising:
a frame defining a first tapped orifice;
a subfloor secured to the frame and defining a receptacle;
a nut defining a second tapped orifice and secured to the subfloor;
a spare tire and jack unit disposed within the receptacle; and
a tow-eye having a threaded rod configured to engage the second tapped orifice to secure the unit to the subfloor and engage the first tapped orifice during a towing operation.

12. The vehicle of claim 11, wherein the first tapped orifice is defined in a front of the frame proximate a front bumper.

13. The vehicle of claim 11, wherein the first tapped orifice is defined in a rear of the frame proximate a rear bumper.

14. The vehicle of claim 11, wherein the tow-eye includes a ridge between an eyelet of the tow-eye and the threaded rod, the spare tire includes an outer surface, and a washer disposed between the spare tire and the tow-eye engages the ridge and the outer surface to secure the unit to the subfloor when the threaded rod engages the subfloor.

* * * * *